United States Patent Office 3,572,131
Patented Mar. 23, 1971

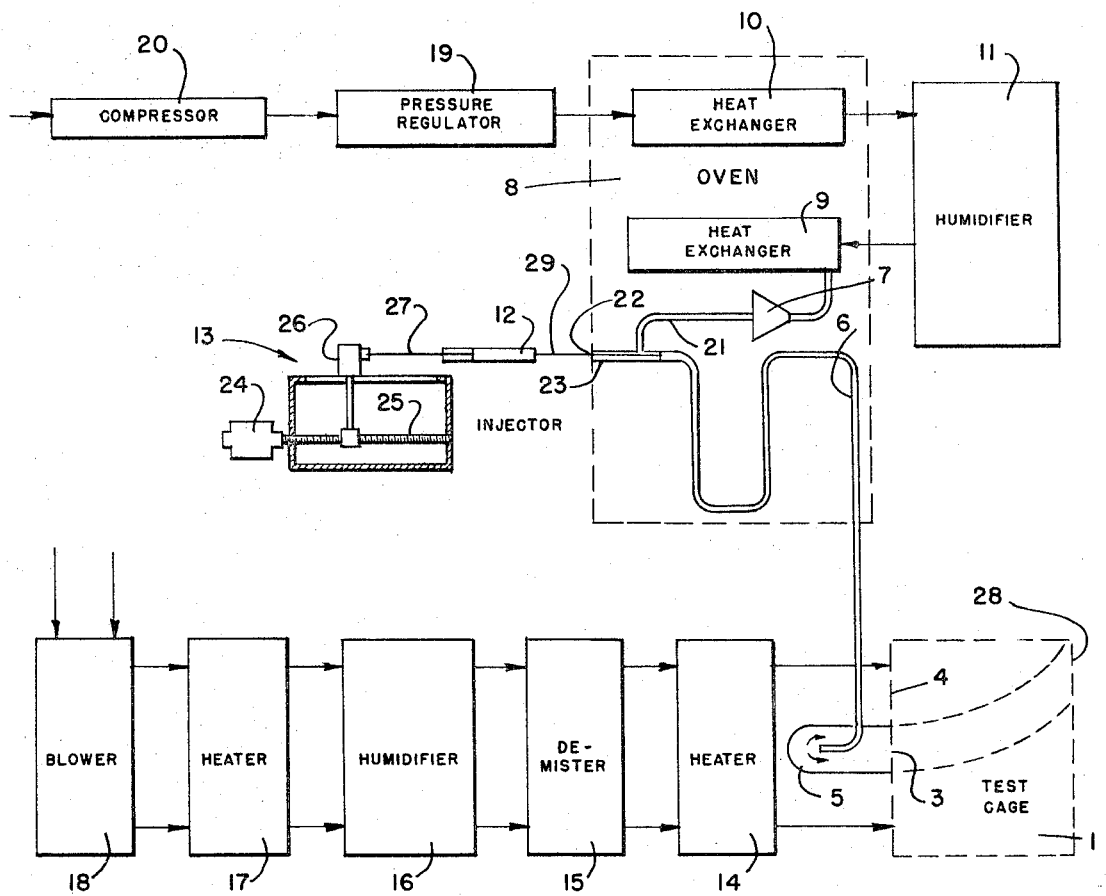

3,572,131
METHOD AND APPARATUS FOR MEASURING THE INSECT REPELLENT PROPERTIES OF CHEMICAL VAPORS
Robert H. Wright, Francis E. Kellogg, and Donald J. Burton, Vancouver, British Columbia, and Philip N. Daykin, Edmonton, Alberta, Canada, assignors to the United States of America
Filed June 30, 1969, Ser. No. 840,899
Claims priority, application Canada, Dec. 12, 1968, 37,578
Int. Cl. G01n 33/00
U.S. Cl. 73—432
13 Claims

ABSTRACT OF THE DISCLOSURE

A method of and apparatus for testing the ability of various chemical vapors to repel mosquitoes and other biting insects by injecting into a cage containing such insects two differing temperature controlled humidified streams of air, one an environmental stream and another stream introduced into the environmental stream, the latter containing the vapor of said chemicals and measuring the intrinsic repellency of said chemicals.

---

The invention herein described was made in the course of or under a contract of subcontract thereunder with the Department of the Army.

BACKGROUND OF THE INVENTION

(1) Field of the invention

The invention relates to a method of and apparatus for determining the insect repellent properties and capabilities of various chemical compositions.

(2) Description of the prior art

In the past effectiveness of repellent preparations has been found by using human volunteers who applied various substances to their arms and exposed them to attack by mosquitoes, either in cages or outdoors.

It has been shown by Daykin, Kellogg and Wright in a paper entitled, "Host Finding and Repulsion of *Aedes aegypti*," published in the "Canadian Entomlogist," vol. 97, No. 3, pages 239–263, 1965, that the principal emanations that guide mosquitoes to a human or animal host are carbon dioxide, which acts mainly as an activator, and warmth and water vapor which act together to create convection currents. The ability of the female mosquito to locate her host depends on her ability to follow these convection currents back to their source at the body surface.

Daykin has shown in an article entitled, "Orientation of *Aedes aegypti* in vertical Air Currents," published in the "Canadian Entomologist," vol. 99, No. 3, pages 303–308, 1967, that an effect of repellent vapors is to interfere with the ability of mosquitoes to respond correctly to convection currents that are moving in a substantially vertical way, either upward or downward, whereas there is no such interference with their response to horizontally-moving air.

SUMMARY OF THE INVENTION

The invention relates to a method of and an apparatus for testing the ability of various chemical vapors to repel mosquitoes and other biting insects. Insect repellents are a necessity to all work or play in places where mosquitoes and other biting insects are a nuisance or where they carry diseases like malaria or yellow fever. In the past good repellent preparations have been found by using human volunteers who applied various substances to their arms and exposed them to attack by mosquitoes, either in cages or outdoors. While such tests have enabled some effective repellents to be found in a purely empirical way, the results have shed little light on the chemical basis of the repellent effect because the tests were adjudged on the basis of time the chemicals gave protection, and therefore two independent factors were tested simultaneously; namely, the intrinsic repellency and the duration of the repellent effect. For the chemical basis of repellency to be discovered, it is necessary to be able to measure intrinsic repellency independently of the persistency of the chemical when applied to the skin or clothing.

It is known that mosquitoes are guided to their host principaly by the emanations of carbon dioxide, which acts as an activator, and warmth and water vapor which act together to create convection currents. The ability of the mosquito to locate its host depends on its ability to follow these convection currents back to their source at the body surface. It is also known that repellent vapors interfere with the ability of mosquitoes to respond correctly to convection currents which are moving in a substantially vertical direction, either upward or downward, whereas there is no such interference with their response to horizontally-moving air. We have also found that many blood sucking insects are reluctant to fly under very windy conditions.

Accordingly, it is an object of this invention to provide a method and apparatus for the measurement of intrinsic insect repellency of chemical vapors exclusive of the effects of persistency of those chemical vapors when applied to clothing or skin.

It is another object of this invention to provide a method and apparatus which will generate convection currents of the type created by the motion of man or animals.

It is still another object to generate such convection currents in a substantially horizontal direction.

A still further object is to generate convection currents such that the velocity of the current does not prevent insect attraction.

A still further object is to provide a method and apparatus for the generation of convection currents into which various chemical vapors in varying concentrations may be injected for the measurement of the intrinsic repellency of the vapors.

These and other objects will become apparent from the following discussion.

The above known principles of insect repellency and attractiveness have been applied in order to device an apparatus in which caged mosquitoes or other blood-feeding arthropods are exposed to two air streams simultaneously. One air stream is an environmental air stream maintained at a moderate temperature and a moderate relative humidity, and the other is a testing air stream within the environmental air stream and which is both warmer and more humid than the environmental stream. The second air stream attracts the mosquitoes in the same way as would a natural or living host. The wall of the cage through which the air enters is of porous material and the insects are attracted to and assembly on the "target" area, which is the part of the wall through which the second air stream of higher temperature and humidity enters. The numbers of insects collected in this way can be counted.

Controlled amounts of a chemical vapor are then added to the second, or testing air stream, but without altering its temperature and humidity, and if the chemical has intrinsic repellent properties, the number of insects in the target area will be diminished. The flow of air and chemical can be varied both in rate and concentration to test the effect of lower or higher concentrations of the chemical.

It is known that repellent vapors interfere with the ability of mosquitoes to respond correctly to air streams that are moving in a substantially vertical way, either upward or downward, whereas there is no such interference with their response to horizontally-moving air. Therefore it is desirable in our method and apparatus to have the air moving through the cage of test insects in a substantially horizontal manner for the following reason. Not all the insects will be disposed to respond to the simulated convection current at any given instant and it is only those that are so disposed whose behavior is of interest. If the air is moving horizontally, or with a substantial horizontal component of motion, such "active" insects will move upwind to the target zone where they can be counted; and inert or different insects will remain elsewhere in the cage and can be ignored. The effect of the repellent is to prevent alighting within the target area but not to prevent the general upwind movement to its vicinity, and so only those insects which alight on the target need to be counted. If the air is moving vertically, or with a minimal horizontal velocity component, the movement toward the target is interfered with as well as the tendency to alight on it, and so there is no longer any discrimination between insects which are inert and those which are disposed to search for a host but are deflected by the repellent.

Under natural conditions mosquitoes and other biting arthropods may be assisted in host location by their visual senses and it may be desirable to impart a visible pattern either moving or stationary to the target area; but in general this is not essential because mosquitoes can usually locate the target without such additional guidance. A visible pattern can, however, very easily be provided in the target area by coloring the portion of the screen through which the secondary air stream enters the cage, or by projecting moving or stationary patterns on said screen potrion by a suitable projector.

BRIEF DESCRIPTION OF THE DRAWING

The figure is a schematic flow diagram of the apparatus.

DESCRIPTION OF THE PREFERRED EMBODIMENT

The invention includes apparatus especially adapted to generate the conditions and carry out the method described above. It may generally be defined as comprising means to generate an environmental air stream at a temperature which can be adjusted to and held constant preferably between 18° to about 32° C. and at a relative humidity which can be held constant in the range from about 25% to 60%, together with means to generate a second air stream of smaller total flow which can be controlled and held constant at a temperature 5° to 15° C. greater than that of the environmental air stream and at a relative humidity which can be controlled and held constant at a value 10% to 30% greater than the humidity of the environmental air stream. In conjunction with the above are means to inject into this second, smaller air stream various volatile chemicals, either pure or in admixture, or dissolved in a suitable solvent, at a controlled and known rate which can be progressively altered, together with means to pass the environmental air stream substantially horizontally through a cage of mosquitoes or other blood-sucking arthropods and, locally within it means to pass the second, lesser air stream simultaneously, so as to generate a target to which the test insects are normally attracted but from which they are repelled by a sufficient concentration of a repellent chemical vapor.

In order to control the temperature and humidity of the two air streams, basically similar methods are used; namely, to pass the air through a bath or spray of water at a controlled temperature so as to render the air saturated at that temperature and then to pass the saturated air through a heat exchanger at a controlled higher temperature so as to reduce the relative humidity to the desired level and at the same time bring the air stream to the desired temperature for passage through the cage.

In order to introduce a volatile chemical, whose intrinsic repellency it is desired to meaure, into the second air stream at a controlled and measured rate, the chemical may be dissolved in a suitable solvent, which has previously been shown to be not itself apperciably repellent, and the solution placed in a hypodermic syringe fitted with a needle which passes through a diaphragm of rubber or other similar material into the tube carrying the second air stream from the conditioning apparatus descibed above to the cage containing the test insects. In the case of a liquid chemical, it may not be necessary to dissolve it in a solvent before placing it in a syringe. To inject the chemical at a controlled rate, the plunger of the syringe may be pushed in by means of a screw which can be rotated at a variable but controlled rate either by a constant speed electric motor and an appropriate gear train, or by a variable speed motor with any one of several well known types of speed control systems.

The method of test, using this apparatus, is to place a cage having screens at the opposite ends so as to permit free passage of the two air streams, and containing a number of test mosquitoes or other blood-sucking arthropods which may be of mixed ages and sexes, so as to be traversed by both air streams simultaneously, and to count the number of individuals which assemble within or near the part of the screen through which the second air stream enters the cage, and to make progressive additions of a chemical or mixture of chemical vapors to the second air stream while counting the number of assembled insects so as to determine the concentration needed to diminish or destroy the normal attractiveness of the second stream. An important feature of our method and apparatus is the freedom of the insects or other arthropods from unnecessary constraints such as would be imposed by the walls of a small cage or constricted channel or by excessive crowding. Therefore the size of the cage should be such that its smallest dimension is not less than 15 centimeters. For some purposes, such as the direct comparison of different repellent substances, it may be desirable to pass more than one second air stream through the cage containing the insects or other arthropods. This requires that the means described above for conditioning the second air stream and for making controlled additions of volatile chemicals to it be duplicated and the test cage be correspondingly enlarged.

In the absence of any air movement, the insects or other arthropods have no means of making a directed movement towards their target and can find it only by a process of random search. If the air is moving, even if only gently, the boundary between the two air streams provides a line with the aid of which they can work their way back to the source of the warmer and more humid air stream. The air movement should, however, not be too great because many blood-sucking insects are reluctant to fly under very windy conditions. Therefore, for test purpose, air velocities between 5 centimeters per second and 25 centimeters per second are the most suitable.

The figure is a schematic flow diagram of the apparatus. The environmental air stream is generated by taking ambient fresh air into blower 18 which may be any conventional blower. The air then passes from blower 18 to heater 17 which raises the temperature of the air to a point where it may be saturated by humidifier 16. Heater 17 and humidifier 16 may be any of the known types, the humidifier being generally of the spray or bubble tower type. The saturated air is then passed through demister 15 which operates to trap any entrained water particles larger than those which have vaporized. The demister may be made of porous polyurethane or any other substance which acts to trap entrained liquid particles. The saturated air then passes to heater 14 which raises the temperature of the stream to a predetermined value thereby decreasing the relative humidity to a predetermined value.

Thus, for example, to produce a primary air stream at 25° C. and approximately 45% relative humidity, the fresh air should be passed from blower 18 to heater 17 where it would be heated to 12.2° C. The air at 12.2° C. then passes to humidifier 16 where it would become saturated at that temperature with a partial pressure of 10.7 mm. of water vapor. The saturated stream then passes through demister 15 to remove entrained particles of water. Finally, the air stream is raised to a temperature of 25° C. in heater 14 at which temperature the saturated vapor pressure of water vapor is 12.76 mm. and the relative humidity is, accordingly, 45%.

From heater 14 the environmental air stream passes in a horizontal direction into cage 1 through porous wall 4 and out the opposite side of cage 1 through porous wall 28.

The second air stream is generated by taking ambient fresh air into compressor 20 of a conventional design and then to pressure regulator 19 also of a conventional design. The compressor is used to give the secondary air stream a velocity greater than the primary air stream upon the secondary air stream's entry into cage 1.

The air stream from pressure regulator 19 flows into oven 8 and specifically into heat exchanger 10 which transfers heat from oven 8 into the air stream thereby raising the temperature of the air stream to a point where it may be humidified by humidifier 11. The oven 8 and heat exchanger 10 may be of a conventional design. Humidifier 11 saturates the air. Humidifier 11 may be of a conventional design generally of the spray or bubble tower type.

From humidifier 11 the air passes to heat exchanger 9 where heat is transferred from oven 8 to the air stream thereby increasing the temperature of the air stream and decreasing the relative humidity. Thus to produce a second air stream at 33° C. and 70% humidity the air stream passes through heat exchanger 10 and is heated to 26.8° C. It is then saturated at that temperature in humidifier 11 where the vapor pressure is 26.4 mm. Thereafter the air stream passes to heat exchanger 9 where it is heated to 33° C. At 33° C. the saturated vapor pressure is 37.7 mm., thereby securing a relative humidity of 70%.

From heat exchanger 9 the air stream passes to pipe 21 and through check valve 7 which prevents backup. After check valve 7 the air stream is admixed with the desired chemical vapor by means of injector 13 and syringe 12. The air stream and chemical vapor then pass through pipe 6 out of oven 8 and into domed hollow cylindrical receiving means 5 and then horizontally into cage 1 through porous target area 3 of porous wall 4 and then out of porous wall 28 on the opposite side of cage 1. Domed cylindrical receiving means 5 is in intimate contact with porous wall 4 at the open end of domed cylindrical receiving means 5. The size of said opening defines the size of the target area.

The temperature, velocity, and humidity of the second air stream are kept higher than the temperature, velocity, and humidity of the environmental air stream to create a gradient for attracting the insects.

Injector 13 and syringe 12 serve to introduce the chemical whose repellency it is desired to measure into the air stream. Syringe 12 is a standard type syringe, the size of which may be alered for increased or decreased flow rates. The chemical is placed into syringe 12. The chemical may be a liquid or it may be a solid dissolved in a suitable solvent, which has previously been shown to be not itself appreciably repellent. To avoid contamination of one chemical by another, the chemical is injected into a removable glass line 23 being disposed in pipe 6, housed in oven 8. The needle 29 of syringe 12 is inserted through rubber diaphragm 22 which covers the opening to pipe 6 and glass line 23.

Syringe 12 may be selectively operated at different rates of discharge by any suitable means, such as a variable speed electrical motor 24 turning a worm drive 25 which moves a slide 26, said slide bearing against or being connected to the handle 27 of the syringe. When motor 24 is operated at a certain speed the chemical is injected into the testing secondary air stream at a known and constant rate. By increasing the speed of the motor a large concentration of the chemical is produced in the secondary air stream.

Typical results obtained with this apparatus and with mosquitoes of the species *Aedes aegypti*, and with ticks of the species *Dermacentor andersoni*, are shown in the following tables:

Table I

Insect: *Aedes aegypti*.
Test chemical: Dimethyl phthalate dissolved in acetone.

| Concentration of chemical in micromols per liter of air: | Number on target |
|---|---|
| zero | 25 |
| 0.0085 | 19 |
| 0.017 | 20 |
| 0.034 | 18 |
| 0.068 | 10 |
| 0.14 | 4 |
| 0.28 | 1 |
| 0.56 | 0 |

Table II

Arthropod: *Dermacentor andersoni*.
Test Chemical: Benzyl benzoate, not diluted.

| Concentration of chemical in micromols per liter of air: | Number on target |
|---|---|
| zero | 8 |
| 0.013 | 7 |
| 0.026 | 3 |
| 0.052 | 2 |
| 0.104 | 1 |

We claim:
1. The method of measuring the concentration of cheicals needed to produce different degrees of repellency to blood-feeding insects which comprises:
   (a) conditioning a first source of ambient air to maintain a predetermined range of temperature and relative humidity;
   (b) conditioning a second source of ambient air to maintain a predetermined range of temperature and relative humidity;
   (c) maintaining said second source of conditioned ambient air at a higher range of temperature and relative humidity than said first source of conditioned ambient air;
   (d) directing said first source of conditioned air in a stream through a cage containing blood-feeding insects to establish an environmental condition;
   (e) directing said second source of conditioned air in a stream through said cage and within said first source of conditioned air to establish a testing stream;
   (f) counting the number of insects assembled in the stream of said second source of conditioned air within said cage;
   (g) injecting a chemical insect repellent into the stream of said second source of conditioned air within said cage at a known rate; and
   (h) counting the number of insects in the stream of said second source of conditioned air during the injection of the insect repellent whereby the intrinsic repellence of the chemical injected my be determined.

2. The method as recited in claim 1 which further comprises:
   (a) conditioning said first source of ambient air to maintain a range of temperature of 18° to 32° C. and relative humidity of 25% to 60% for the environmental stream within the cage; and (b) conditioning said second source of ambient air to maintain a range of temperature 5° to 15° C. and 10% to 30% relative humidity higher than the temperature and relative humidity range of said first source of environmental air to provide a testing stream within the cage.

3. The method as recited in claim 1 which further comprises:
   (a) providing a porous target area in the cage; and
   (b) directing said first and second sources of conditioned air as environmental and testing streams, said testing stream being within said environmental stream, through said porous target area for attracting insects to said porous target area.

4. Apparatus for measuring the concentration of repellent chemicals required to produce different degrees of repellency to blood-feeding insects comprising:
   (a) a first air conditioning means for maintaining an ambient air input at a predetermined range of temperature and relative humidity;
   (b) a second air conditioning means for maintaining an ambient air input at a predetermined range of temperature and relative humidity higher than said first air conditioning means;
   (c) a cage for containing a supply of insects;
   (d) means for directing the conditioned air output of said first and second air conditioning means in a substantially horizontal path through said cage the output of said first air conditioning means producing an environmental air stream and the output of said second air conditioning means producing a testing air stream;
   (e) means for measuring the rate of flow of said testing air stream;
   (f) means for injecting an insect repellent chemical into said testing air stream; and
   (g) means for controlling and measuring the rate of application of the insect repellent chemical into said testing air stream.

5. Apparatus as recited in claim 4 wherein said cage has opposed porous walls to permit flow of said environmental and testing air streams through said cage.

6. Apparatus as recited in claim 5 wherein one of said porous walls upon which said testing air stream first impinges constitutes a target area for measuring effectiveness of insect repellents upon insects within said target area.

7. Apparatus as recited in claim 4 wherein said first air conditioning means comprises:
   (a) air circulating means having an ambient air input;
   (b) first heater means receiving the air flow from the output of said air circulating means;
   (c) humidifier means receiving the air flow from the output of said first heater means;
   (d) demister means receiving the air flow from the output of said humidifier means; and
   (e) second heater means receiving the air flow from the output of said demister means, the conditioned air output from said second heater means constituting an environmental air stream directed through said cage.

8. Apparatus as recited in claim 4 wherein said second air conditioning means comprises:
   (a) compressor means having an ambient air input;
   (b) pressure regulating means connected to the air flow at the output of said compressor means;
   (c) first and second heat exchanger means located within a source of heat;
   (d) humidifier means located externally of said source of heat;
   (e) said first heat exchanger means communicating with the pressure-regulated air flow from said compressor and said second heat exchanger means communicating with the air flow from the output of said humidifier;
   (f) chamber means located externally of said cage and communicating therewith; and
   (g) means conducting air flow of predetermined range of temperature and relative humidity from said second heat exchanger to said chamber means, the conditioned air output of said chamber constituting a testing air stream directed through said cage.

9. Apparatus as recited in claim 4 wherein said means for injecting an insect repellent chemical comprises:
   (a) an injection syringe for directing insect repellents into said testing air stream;
   (b) drive means including a variable speed prime mover, speed control means interconnecting said injection syringe and said prime mover for controlling the rate of discharge of the insect repellent from said syringe into said testing air stream; and
   (c) removable coupling means receiving the needle of said syringe and connected to said testing air stream.

10. The method as recited in claim 3 which further comprises:
    (a) providing means for projecting images on said target area; and
    (b) selectively projecting moving and stationary images on said target area.

11. The method as recited in claim 3 which further comprises applying colors to said target area with the boundary defined by the impingement of said target stream.

12. Apparatus as recited in claim 6 further comprising means for selectively projecting moving and stationary images on said target area.

13. Apparatus as recited in claim 6 further comprising a colored portion of the porous wall within the boundary of the target area impinged by said testing air stream.

References Cited

FOREIGN PATENTS 985,015   3/1965   Great Britain _____ 73—432

S. CLEMENT SWISHER, Primary Examiner